US009008673B1

(12) United States Patent
Sanjeev

(10) Patent No.: US 9,008,673 B1
(45) Date of Patent: Apr. 14, 2015

(54) DATA COMMUNICATION DEVICE WITH INDIVIDUAL APPLICATION BANDWIDTH REPORTING AND CONTROL

(75) Inventor: Kumar Sanjeev, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 888 days.

(21) Appl. No.: 12/829,869

(22) Filed: Jul. 2, 2010

(51) Int. Cl.
 *H04W 72/00* (2009.01)
 *H04L 12/26* (2006.01)
 *H04L 12/24* (2006.01)
 *H04L 12/801* (2013.01)
 *H04L 12/851* (2013.01)

(52) U.S. Cl.
 CPC ............ *H04L 43/16* (2013.01); *H04L 41/0896* (2013.01); *H04L 47/193* (2013.01); *H04L 47/2441* (2013.01)

(58) Field of Classification Search
 CPC ... H04L 41/0896; H04L 43/16; H04L 47/193; H04L 47/2441; H04L 49/90
 USPC .............. 455/405, 425, 566, 450, 451, 452.1, 455/452.2, 509, 423; 709/223, 224, 226, 709/227, 235; 370/229, 230, 232, 233, 234, 370/235, 328, 329
 See application file for complete search history.

(56) References Cited

U.S. PATENT DOCUMENTS

| 8,402,165 | B2 * | 3/2013 | Deu-Ngoc et al. ............ 709/240 |
| 2002/0172222 | A1 * | 11/2002 | Ullmann et al. .............. 370/468 |
| 2003/0169460 | A1 * | 9/2003 | Liao et al. ................ 358/426.08 |
| 2003/0221008 | A1 * | 11/2003 | England et al. ............... 709/226 |
| 2005/0107135 | A1 * | 5/2005 | Deeds et al. ............... 455/575.1 |
| 2007/0061429 | A1 * | 3/2007 | Lin ............... 709/220 |
| 2007/0180119 | A1 * | 8/2007 | Khivesara et al. ............ 709/226 |
| 2007/0294410 | A1 * | 12/2007 | Pandya et al. ................. 709/226 |
| 2008/0005336 | A1 * | 1/2008 | Cohen et al. .................. 709/227 |
| 2008/0089303 | A1 * | 4/2008 | Wirtanen et al. .............. 370/342 |
| 2010/0107172 | A1 * | 4/2010 | Calinescu et al. ............ 718/104 |
| 2010/0278086 | A1 * | 11/2010 | Pochiraju et al. ............. 370/310 |
| 2010/0333028 | A1 * | 12/2010 | Welsh et al. .................. 709/232 |

FOREIGN PATENT DOCUMENTS

WO WO 2007034387 A2 * 3/2007
WO WO 2009054565 A1 * 4/2009

* cited by examiner

*Primary Examiner* — Olumide T Ajibade Akonai

(57) ABSTRACT

An application bandwidth monitor may be configured to determine the amount of data communication channel bandwidth being utilized by each active data communication application within a data communication device. A user interface may be configured to report this information and to receive information indicative of a desired bandwidth allocation among the active applications. An application bandwidth controller may be configured to control the maximum bandwidth that may be utilized by each active data communication application, based on this user information.

20 Claims, 2 Drawing Sheets

DATA COMMUNICATION DEVICE WITH INDIVIDUAL APPLICATION BANDWIDTH REPORTING AND CONTROL

BACKGROUND

1. Technical Field

This disclosure relates to data communication devices which run multiple data communication applications simultaneously which, in turn, cause data to be transferred over data communication channels having limited bandwidths.

2. Description of Related Art

There are a broad variety of data communication devices, such as smart cell phones, laptop computers, PDAs, and desktop computers. These devices often run data communication applications, such as applications that stream multimedia content, applications that aide in navigation (usually in mobile data communication devices), web surfing application that receive automated data updates from websites, texting applications, file transfer applications, and messaging applications.

Many data communication devices are capable of running multiple data communication applications at the same time. Many users take advantage of this multi-tasking functionality. Sometimes, however, the rate of data transfer may not be satisfactory. For example, freezes may be experienced while media is being streamed and file transfers may be too slow.

When these problems arise, the user may not know what is causing them and, in turn, what needs to be done to solve them. Some users may close one or more some applications in hopes that this will improve the performance of those that remain open. Sometimes, however, the problem lies at the other end of the communication channel. The bandwidth that was being used by closed applications may also be so small that their closure does not result in any significant improvement. Thus, randomly closing applications may not help, but may only result in the benefits provided by these closed applications being lost. In still other cases, the user may not know what action to take to solve the problem, but may instead just endure the consequences of poor application performance.

SUMMARY

A data communication device may transfer information over a data communication channel which has a limited bandwidth. The data communication device may include a computer processing system, an application bandwidth monitor, a user interface, and an application bandwidth controller.

The computer processing system may be configured to selectively activate and run a plurality of data communication applications at the same time and to allow each active and running data communication application to transfer information over the data communication channel.

The application bandwidth monitor may be configured to determine the absolute or relative amount of data communication channel bandwidth being utilized by data that is being sent and/or received by each active data communication application over the data communication channel. The determination may be as a percentage of data communication channel bandwidth being used by each active data communication application. The user interface may be configured to report these amounts. The user interface may include a display.

At least one of the data communication applications may be configured to stream multimedia, provide real-time navigation information, and/or communicate with one or more websites that automatically provide data updates.

The user interface may be configured to allow a user to indicate whether each active data communication application may utilize data communication channel bandwidth. The application bandwidth controller may be configured to control whether each active data communication application may use data communication channel bandwidth, based on the indications provided by the user.

The user interface may be configured to allow a user to indicate the maximum bandwidth that may be utilized by each active data communication application to communicate over the data communication channel. The application bandwidth controller may be configured to control the maximum bandwidth that may be utilized by each active data communication application to communicate over the data communication channel, based on the indications provided by the user. The maximum bandwidth that may be utilized by each active data communication application may be an absolute number or a number relative to the total data communication channel bandwidth, such as a percentage of that bandwidth.

The user interface may be configured to allow a user to indicate the priority that each active data communication application has to data communication channel bandwidth. The application bandwidth controller may be configured to control the priority that each active data communication application has to data communication channel bandwidth, based on the indications provided by the user. The application bandwidth controller may be configured to deactivate an active data communication application at such times as its active status reduces data communication channel bandwidth that is being used by one or more other data communication applications which are indicated by the indications provided by the user to have a higher priority.

The computer processing system, the application bandwidth monitor, the application bandwidth controller, and the user interface may be part of a smart cell phone.

Non-transitory computer-readable storage media may contain computer-readable programming instructions which, when read and executed by a data communication device, may cause the data communication device to perform any of the operations describe herein.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Figure 1:
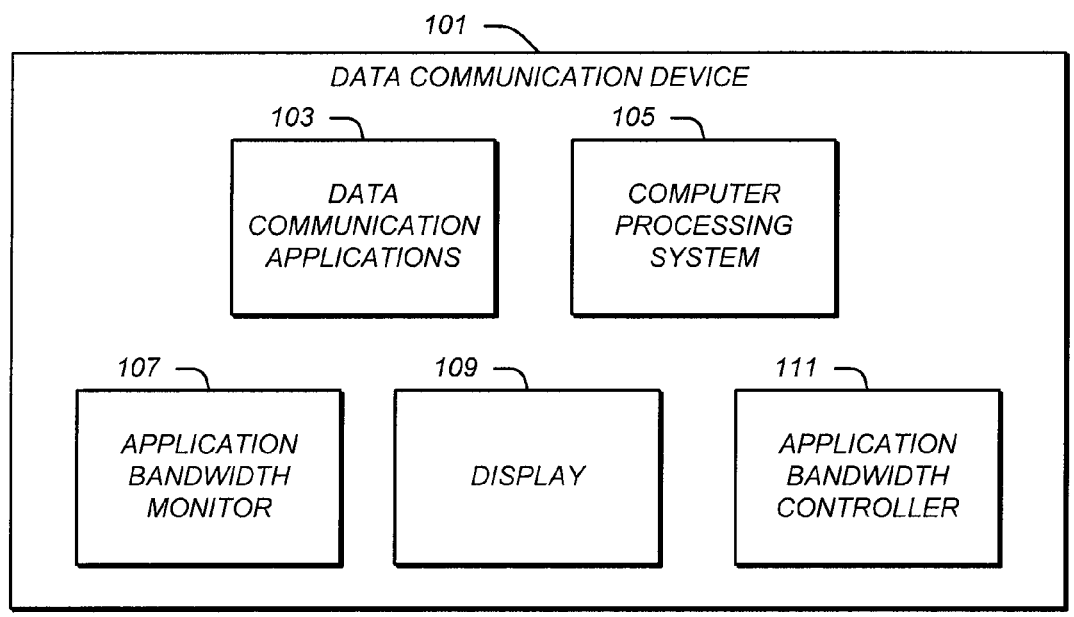
FIG. 1 is an example of a data communication device.

FIG. 1 is an example of a data communication device 101. The data communication device 101 may be of any type. For example, the data communication device may be a smart cell phone, laptop computer, PDA, or desktop computer.

The data communication device 101 may be configured to transfer information over a data communication channel. The data communication channel may have a limited bandwidth. The data communication channel may include a wired and/or wireless communication segment. One or more segments of the data communication channel may utilize any type of communication protocol, such as Ethernet, DSL, EVDO, 3G, and/or 4G. A single data communication channel may include a mixture of these types. The bandwidth of the data communication channel may be limited to the bandwidth of its slowest segment. The channel may have a bandwidth for uploaded data that is separated and different from the bandwidth for downloaded data.

The data communication device 101 may store a plurality of data communication applications 103 in a memory device, such as on a hard disk drive or a flash memory. Each of the data communication applications 103 may include computer programming instructions and related data that are configured to communicate data through the data communication device 101 and over the data communication channel.

The data communication applications 103 may be of any type. For example, the data communication applications 103 may include applications that stream multimedia content, applications that aide in navigation (typically in mobile data communication devices), web surfing application that automatically receive data updates, texting applications, file transfer applications, and messaging applications.

The data communication device 101 may include a computer processing system 105. The computer processing system may be configured to selectively activate and run a plurality of the data communication applications 103 at the same time using time splicing or parallel processing. These applications may be activated by one or more commands of a user communicating with the computer processing system 105 through a user interface. The computer processing system 105 may be configured to allow and to facilitate each active and running data communication application to transfer information over the data communication channel.

The data communication device 101 may include an application bandwidth monitor 107. The application bandwidth monitor 107 may be configured to determine the amount of data communication channel bandwidth that is being utilized by each active data communication application.

The user interface may be configured to report the amount of data communication channel bandwidth being utilized by each active data communication application, as determined by the application bandwidth monitor 107.

The application bandwidth monitor 107 may be configured to determine the amount of data communication channel bandwidth being utilized by the data being received and/or sent by each active data communication application over the data communication channel. The user interface may be correspondingly configured to report the determined amount of data communication channel bandwidth being utilized by the data being received and/or sent by each active data communication application over the data communication channel.

The amount of data communication channel bandwidth being utilized by each active data communication application may be determined by the application bandwidth monitor 107 and/or reported by the user interface as an absolute amount, an amount relative to the total data communication channel bandwidth, or both. When determining and reporting a relative amount, the relative amount may be determined and/or reported as a percentage of the data communication channel bandwidth. For this purpose, the computer processing system 105 may be configured to test the data communication channel to determine its sending and/or receiving bandwidth. In addition or instead, the computer processing system 105 may be configured to query the user of the data communication device 101 through the user interface for this information.

The computer processing system 105 may include an operating system. The operating system may be configured to cooperate with each of the active data communication applications and to develop information that may be relevant to the bandwidth that is being utilized by each active data communication application. The operating system may be configured with APIs through which the data communication applications may communicate with the data communication channel. The operating system may be configured with APIs which provide relevant bandwidth information. The application bandwidth monitor 107 may be configured to determine these bandwidths by utilizing these bandwidth APIs. In addition or instead, the application bandwidth monitor 107 may be configured to intercept data communications going to and/or coming from each active data communication application, thereby enabling the application bandwidth monitor 107 to itself directly determine their individual bandwidths.

The user interface may be configured to allow the user to indicate whether each active data communication application may utilize data communication channel bandwidth, the maximum bandwidth that may be utilized by each active data communication application to communicate over the data communication channel, and/or the priority that each active data communication application has to data communication channel bandwidth. When allowing the user to indicate the maximum bandwidth that may be utilized by each active data communication application to communicate over the data communication channel, the user interface may be configured to allow the user to indicate this maximum bandwidth as an absolute number and/or as a relative number, such as a percentage of available data communication channel bandwidth.

The data communication device 101 may include an application bandwidth controller 111. The application bandwidth controller 111 may be configured to control the data communication channel bandwidth being utilized by each active data communication application, based on the bandwidth indications provided by the user through the user interface. For example, the application bandwidth controller 111 may be configured to control whether each active data communication application may use data communication bandwidth, to control the maximum bandwidth that may be utilized by each active data communication application, either in absolute or relative amounts, and/or to control the priority that each application data communication application has to data communication channel bandwidth. When controlling priority, the application bandwidth controller may be configured to deactivate an active data communication application at such times as its active status reduces data communication channel bandwidth that is being used by one or more other data communication applications which have been indicated by the user to have a higher priority.

An active data communication application may not utilize all of the bandwidth which may have been allocated to it. In this situation, the application bandwidth controller 111 may be configured to increase the allocations given to the other active applications during these times. The increase may be equal, pro rata, or in accordance with a different algorithm.

The user interface may include a display 109.

Figure 2:
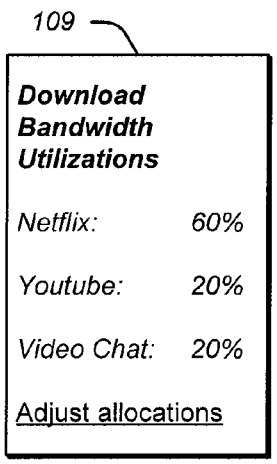
FIG. 2 is an example of a display showing download bandwidth utilizations in relative amounts.

FIG. 2 is an example of the display 109 showing download bandwidth utilizations in relative amounts. As illustrated in FIG. 2, the display 109 may display the names of the active data communication applications (e.g., Netflix, YouTube, and VideoChat), along with the relative amount of the data communication bandwidth which each active data communication application is using. As illustrated in FIG. 2, this relative amount may be specified as a percentage. The display may also include an "Adjust Allocations" link, as also illustrated in FIG. 2. When selected, this link may cause a display of download bandwidth allocations made or to be made by the user. This allocations display may instead be included with what is shown in FIG. 2.

Figure 3:
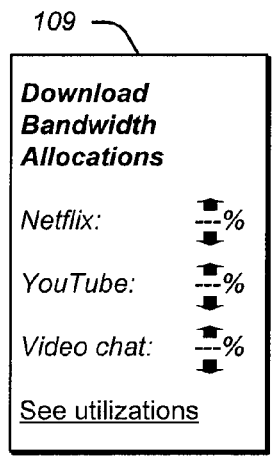
FIG. 3 is an example of a display showing download bandwidth allocations which a user may specify in relative amounts.

FIG. 3 is an example of a display showing download bandwidth allocations which a user may specify in relative amounts. As illustrated in FIG. 3, the user may do so by repeatedly actuating an up or down arrow control in connection with each bandwidth application control until the desired bandwidth is select. Other types of user controls may be provided in addition or instead, such as a field which accepts direct numeric entries.

The application bandwidth controller 111 may be configured to ensure that the allocated bandwidths of all active applications do not exceed 100% of the available data communication channel bandwidth. For example, it may be configured to cause an increase in one allocation to cause a corresponding decrease in one or more other allocations. In some embodiments, a total allocation of less than 100% may be permitted, thereby leaving bandwidth available for dormant applications that may later be activated. A total allocation in excess of 100%, however, may not be permitted.

Figure 4:
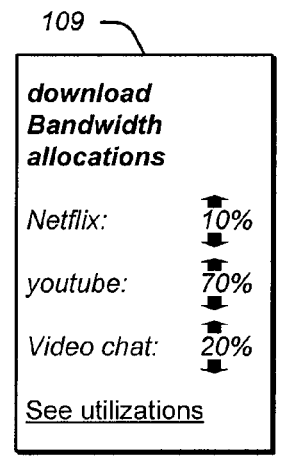
FIG. 4 is an example of a display showing download bandwidth allocations which a user has specified in relative amounts.

FIG. 4 is an example of a display showing download bandwidth allocations which a user has specified in relative amounts. FIG. 4 illustrates what relative percentage allocations might look like after actuation by the user of the various up and down arrows.

Figure 5:
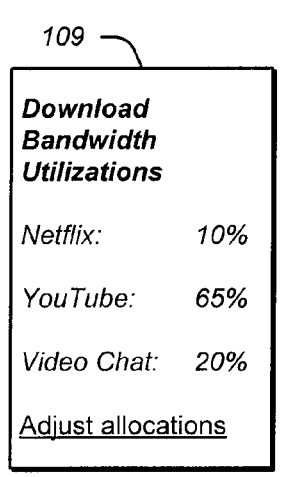
FIG. 5 is an example of a display showing download bandwidth utilizations in relative amounts after a user has specified the relative bandwidth allocations illustrated in FIG. 4.

FIG. 5 is an example of a display showing download bandwidth utilizations in relative amounts after a user has specified the relative bandwidth allocations illustrated in FIG. 4. A comparison of FIG. 5 with FIG. 2 illustrates how bandwidth utilizations by each active data communication application can be altered by user-set allocations under the control of the application bandwidth controller 111. As also illustrated by a comparison of the 70% bandwidth allocation for YouTube illustrated in FIG. 4 with the 65% utilization for YouTube illustrated in FIG. 5, an active data communication application may utilize less than its allocated bandwidth.

Figure 6:
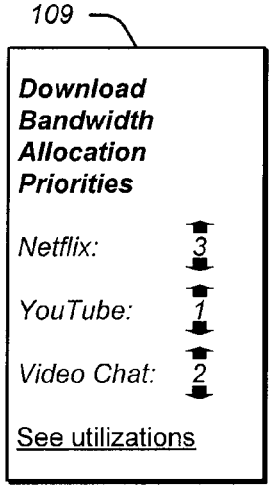
FIG. 6 is an example of a display showing download bandwidth allocations which a user has specified by application priority.

FIG. 6 is an example of a display showing download bandwidth allocations which a user has specified by application priority. FIG. 6 illustrates a still further way of allocating the available bandwidth among the active data communication applications. As illustrated in FIG. 6, the priority of each application may be specified, again by repeatedly actuating up and/or down arrows. When the priority of one active application is altered, the application bandwidth controller 111 may be configured to automatically cause a corresponding change in the priority of one or more of the other active applications, thereby ensuring that no two applications are given the same priority. Alternatively, the application bandwidth controller 111 may be configured to allow applications which are given the same priority to share in the available bandwidth when applications with a higher priority are not utilizing all of the available bandwidth. In this situation, the application bandwidth controller 111 may be configured to increase the bandwidth allocations given to the other active applications in either an equal, pro rata, or other amounts so as to cause all of the available bandwidth to be utilized.

FIGS. 2-6 illustrate bandwidth utilizations and allocations in relative amounts, in this case percentages of the bandwidth of the data communication channel. The relative amounts could instead be specified more generally, such as Large, Med, or Small. The bandwidth utilizations and allocations may in addition or instead be specified in absolute in amounts, such as in bits or bytes per second. Absolute amounts may also be specified more generally with designations such as Fast, Med, or Slow.

Figure 7:
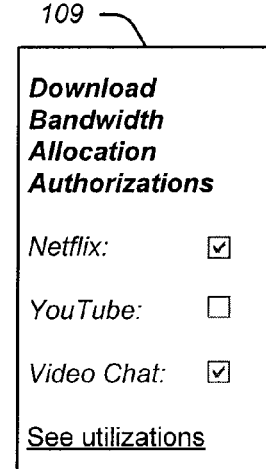
FIG. 7 is an example of a display showing download bandwidth allocations which a user has specified by checked or unchecked boxes.

FIG. 7 is an example of a display showing download bandwidth allocations which a user has specified by checked or unchecked boxes. When an active data communication application is not checked in FIG. 6, the application bandwidth controller 111 may refuse to allow that application to utilize any portion of the bandwidth. The application bandwidth controller 111 may be configured to allow checked applications to share in the available bandwidth equally or based on any other type of allocation. Means other than check boxes may instead be used to communicate the authorizations.

A "See utilizations" link may be provided on the allocations display 109 in FIGS. 3-7 so that the user may easily return to the utilizations display in FIG. 2 to see the actual bandwidth utilizations that may have resulted from the allocation settings.

FIGS. 2-7 illustrate download bandwidth utilizations or allocations. Comparable displays may be used in connection with upload bandwidth utilizations and allocations, or the upload utilizations or allocations may be specified in the same display as the download utilizations or allocations, such as in a second column to the left or right of the columns which are shown in these figures.

The computer processing system 105 may be any type of computer processing system. It may include one or more microprocessors, memory devices, and associated support chips and other devices. The computer processing system 105 may include an operation system having APIs as discussed above, one or more drivers, as well as other types of software.

The application bandwidth monitor 107 and the application bandwidth controller 111 may be software that runs under the management and control of the computer processing system 105. This software, along with all other software in the data communication device 101, may be stored within or outside of the data communication device 101 in a local data storage device, such as a hard disk drive or a flash memory.

The application bandwidth monitor 107, application bandwidth controller 111, and any operating system and/or other software which may be part of the computer processing system 105 may initially be contained on non-transitory computer-readable storage media, such as one or more DVDs, CDs, hard disk drives, and/or flash memories. This software may be transferred to the data communication device 101 for storage on a local data storage device within the data communication device 101 or outside of it.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, the user interface may be configured to permit different bandwidth allocations to be made based on varying criteria, such as the time of day, type of connection, or location of device. The application bandwidth controller, in turn, may be configured to locate and enforce the bandwidth allocations that were made for the current circumstances, as detected by other components in the systems. For example, a user may allocate Video Chat more bandwidth during the day, but give Netflix more bandwidth during the night; may allocate substantial bandwidth to a streaming application while on a WiFi connection, but much more limited or even no bandwidth while only on a cellular network; and/or may give a Live TV application substantial bandwidth while at home, but much more limited or no bandwidth while away from home.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A data communication device for transferring information over a data communication channel which has a limited bandwidth, the data communication device comprising:
    a computer processing system configured to selectively activate and run a plurality of data communication applications at the same time and to allow each active and running data communication application to transfer information over the data communication channel;
    an application bandwidth monitor configured to determine the amount of data communication channel bandwidth being utilized by each active data communication application based at least in part on upload bandwidth utilization by each active data communication application; and
    a user interface configured to report the determined amount of data communication channel bandwidth being utilized by each active data communication application,
    wherein the application bandwidth monitor is configured to determine the amount of upload data communication channel bandwidth being utilized by the data being sent by each active data communication application over the data communication channel, and the user interface is configured to report the determined amount of data communication channel bandwidth being utilized by the data being sent by each active data communication application over the data communication channel.

2. The data communication device of claim 1 wherein:
    the application bandwidth monitor is configured to determine the amount of data communication channel bandwidth being utilized by the data being received by each active data communication application over the data communication channel; and
    the user interface is configured to report the determined amount of data communication channel bandwidth being utilized by the data being received by each active data communication application over the data communication channel.

3. The data communication device of claim 1 wherein:
    the application bandwidth monitor is configured to determine the amount of data communication channel bandwidth being utilized by the data being sent by each active data communication application over the data communication channel; and
    the user interface is configured to report the determined amount of data communication channel bandwidth being utilized by the data being sent by each active data communication application over the data communication channel.

4. The data communication device of claim 1 wherein the application bandwidth monitor is further configured to:
    determine the amount of data communication channel bandwidth being utilized by each active data communication application based at least in part on download bandwidth utilization by each active data communication application; and
    determine the amount of download data communication channel bandwidth being utilized by the data being received by each active data communication application over the data communication channel.

5. The data communication device of claim 1 wherein:
    the application bandwidth monitor is configured to determine the absolute amount of data communication channel bandwidth being utilized by each active data communication application; and
    the user interface is configured to report the determined absolute amount of data communication channel bandwidth being utilized by each active data communication application.

6. The data communication device of claim 1 wherein:
    the application bandwidth monitor is configured to determine the relative amount of data communication channel bandwidth being utilized by each active data communication application relative to the total data communication channel bandwidth; and the user interface is configured to report the determined relative amount of data communication channel bandwidth being utilized by each active data communication application relative to the total data communication channel bandwidth.

7. The data communication device of claim 6 wherein:

the application bandwidth monitor is configured to determine the percentage of data communication channel bandwidth being used by each active data communication application; and the user interface is configured to report the determined percentage of data communication channel bandwidth being used by each active data communication application.

8. The data communication device of claim 1 further comprising at least one of the data communication applications and wherein the at least one of the data communication applications is configured to stream multimedia.

9. The data communication device of claim 8 further comprising at least one of the data communication applications and wherein the at least one of the data communication applications is configured to provide real-time navigation information.

10. The data communication device of claim 8 further comprising at least one of the data communication applications and wherein the at least one of the data communication applications is configured to communicate with one or more websites that automatically provide data updates.

11. The data communication device of claim 1:

wherein the user interface is configured to allow a user to indicate whether each active data communication application may utilize data communication channel bandwidth; and further comprising an application bandwidth controller configured to control whether each active data communication application may use data communication channel bandwidth, based on the indications provided by the user.

12. The data communication device of claim 1:

wherein the user interface is configured to allow a user to indicate the maximum bandwidth that may be utilized by each active data communication application to communicate over the data communication channel; and further comprising an application bandwidth controller configured to control the maximum bandwidth that may be utilized by each active data communication application to communicate over the data communication channel, based on the indications provided by the user.

13. The data communication device of claim 12 wherein the maximum bandwidth that may be utilized by each active data communication application is an absolute number.

14. The data communication device of claim 12 wherein the maximum bandwidth that may be utilized by each active data communication application is a number relative to the total data communication channel bandwidth.

15. The data communication device of claim 1:

wherein the user interface is configured to allow a user to indicate the priority that each active data communication application has to data communication channel bandwidth; and further comprising an application bandwidth controller configured to control the priority that each active data communication application has to data communication channel bandwidth, based on the information provided by the user.

16. A data communication device for transferring information over a data communication channel which has a limited bandwidth, the data communication device comprising:

a computer processing system configured to selectively activate and run a plurality of data communication applications at the same time and to allow each active and running data communication application to transfer information over the data communication channel;

an application bandwidth monitor configured to:

determine the amount of upload data communication channel bandwidth being utilized by the data being sent by each active data communication application over the data communication channel; and determine the amount of data communication channel bandwidth being utilized by each active data communication application based at least in part on upload bandwidth utilization by each active data communication application;

an application bandwidth controller configured to control the priority that each active data communication application has to data communication channel bandwidth; and a user interface configured to report the determined amount of data communication channel bandwidth being utilized by each active data communication application, wherein:

the user interface is configured to allow a user to indicate the priority that each active data communication application has to data communication channel bandwidth; and the application bandwidth controller is configured to deactivate an active data communication application at such times as its active status reduces data communication channel bandwidth that is being used by one or more other data communication applications which are indicated by the user to have a higher priority.

17. The data communication device of claim 1 wherein the computer processing system, the application bandwidth monitor, and the user interface are part of a smart cell phone.

18. Non-transitory computer-readable storage media containing computer-readable programming instructions which, when read and executed by a data communication device, cause the data communication device to:

selectively activate and run a plurality of data communication applications at the same time and allow each active and running data communication application to transfer information over a data communication channel which has a limited bandwidth;

determine the amount of upload data communication channel bandwidth being utilized by the data being sent by each active data communication application over the data communication channel;

determine the amount of data communication channel bandwidth being utilized by each active data communication application based at least in part on upload bandwidth utilization by each active data communication application;

report the determined amount of data communication channel bandwidth being utilized by each active data communication application;

report the determined amount of upload data communication channel bandwidth being utilized by the data being sent by each active data communication application over the data communication channel; and deactivate an active data communication application at such times as its active status reduces data communication channel bandwidth that is being used by one or more other data communication applications which are indicated by the user to have a higher priority.

19. The non-transitory computer-readable storage media of claim 18 wherein the computer-readable programming instructions, when read and executed by the data communication device, cause the data communication device to:

allow a user to indicate whether each active data communication application may utilize data communication channel bandwidth; and control whether each active data communication application may use data communication channel bandwidth, based on the indications provided by the user.

20. The non-transitory computer-readable storage media of claim 18 wherein the data communication device is a smart cell phone.

* * * * *